United States Patent
Copp et al.

(10) Patent No.: US 8,167,959 B2
(45) Date of Patent: May 1, 2012

(54) ENVIRONMENTALLY-FRIENDLY KELP-BASED ENERGY SAVING LUBRICANTS, BIOFUELS, AND OTHER INDUSTRIAL PRODUCTS

(75) Inventors: Emmanuel Anthony Copp, Dallas, TX (US); Dale Glantz, San Diego, CA (US)

(73) Assignee: Knocean Sciences, Inc., Dallas, TX (US)

( * ) Notice: Subject to any disclaimer, the term of this patent is extended or adjusted under 35 U.S.C. 154(b) by 0 days.

(21) Appl. No.: 12/898,552

(22) Filed: Oct. 5, 2010

(65) Prior Publication Data

US 2011/0152144 A1 Jun. 23, 2011

Related U.S. Application Data

(60) Provisional application No. 61/249,171, filed on Oct. 6, 2009.

(51) Int. Cl.
*C10L 5/42* (2006.01)
*C10L 5/44* (2006.01)
*C10M 173/02* (2006.01)

(52) U.S. Cl. .......... 44/605; 508/112; 508/216
(58) Field of Classification Search .......... 508/112, 508/216; 44/605
See application file for complete search history.

(56) References Cited

U.S. PATENT DOCUMENTS

| | | | |
|---|---|---|---|
| 2009/0105190 A1* | 4/2009 | Hatano et al. | 514/54 |
| 2010/0077654 A1* | 4/2010 | Wu et al. | 44/385 |

* cited by examiner

*Primary Examiner* — Walter D Griffin
*Assistant Examiner* — Vishal Vasisth
(74) *Attorney, Agent, or Firm* — William E. Bradley; Roylance, Abrams, Berdo & Goodman, L.L.P.

(57) ABSTRACT

A natural algae-based synthetic lubricant derived from harvesting kelp from the ocean, recovering sieve sap from the kelp, drying the sieve sap, and removing salts and oxides to leave a composition having a concentration of polyols (Mannitol about 70% and Mannose about 0.4%) and about 28% by weight of a high molecular weight polymer. The synthetic lubricant may be used as a drag reducing agent and additive for existing lubricants and also further reacted with fatty esters to form a hybrid lubricant that may serve as a total replacement for existing lubricants.

5 Claims, 5 Drawing Sheets

Kelp Process Block Diagram

Figure 1 – Kelp Process Block Diagram

FIGURE 3 - Kelp & Slime By Product Process Flow

ENVIRONMENTALLY-FRIENDLY KELP-BASED ENERGY SAVING LUBRICANTS, BIOFUELS, AND OTHER INDUSTRIAL PRODUCTS

I. CROSS-REFERENCE TO RELATED APPLICATIONS

The present application claims the benefit of priority under 35 U.S.C. §119(e) from U.S. Provisional Application No. 61/249,171, filed on Oct. 6, 2009, the entire contents of which are hereby incorporated by reference in their entirety.

II. FIELD OF THE INVENTION

The present invention relates to new and useful kelp-based products and methods for acquiring, processing, refining and using these novel products. More particularly, the present invention relates to environmentally-friendly methods and means for harvesting kelp and processing it for use in various industrial applications including environmentally-friendly and energy saving lubricants, lubricant additives, biofuels, bio-based chemicals, oil remediation dispersants and sorbents, non-toxic health supplements, nutraceutical, cosmeceutical and pharmaceutical products/ingredients, horticultural and aquacultural feed or supplements, and a recoverable source of trace elements.

II. BACKGROUND OF THE INVENTION

A. The Need for "CleanTech"

As governments and companies become more and more aware of the global energy crisis and the adverse environmental effects caused by current hydrocarbon—based energy use and its resultant pollution, a dramatic push to find so-called "clean" energy solutions and "green" products has risen to the forefront of energy exploration. The recent push is two-fold, first, the realization that oil and coal are depleteable resources that may be exhausted in the foreseeable future if current consumption trends continue has resulted in a great deal of emphasis on finding alternative, and preferably, non-depleteable or rengenerable energy sources such as solar, wind, hydro and other recurring sources of untapped potential energy. Secondly, the systemic issue of pollution and waste caused by production and use of current energy sources, including coal ash, carbon emissions, and nuclear waste, is an additional concern that has led energy producers and users, as well as other industrial manufactures, to attempt to find ways to conserve, re-use, or recycle in an effort to reduce their carbon footprint, e.g., become more "green."

To date, prior artisans have focused for the most part on one or the other problems in the art. For example, some prior artisans have invested heavily in research, development, equipment and infrastructure for harnessing natural energy sources such as solar or wind power in an effort to address the diminishing supply of the world's oil. While these technologies demonstrate great potential to provide energy in a world without oil, the current realities of the technology make their widespread use both cost prohibitive and logistically impossible. Further, these technologies still suffer from the drawbacks of requiring large fixed facilities to turn solar or wind energy into a useable form. A recent entrant into the field of replenishable energy sources is algae-pond farming.

As will be understood by one of ordinary skill in the art, this emerging technology is based on the cultivation of algae in large, man-made and operated ponds, to capture the by-products (carbon dioxide) of the algae's respiration to use as a power source. This technology suffers from several drawbacks that have made it unattractive and unpalatable for most jurisdictions. First, in order to provide any meaningful energy, huge ponds must be operated and intensively farmed solely for the growth of algae. Secondly, the ponds must be close to the production facility and end-users to be viable. As will be appreciated, the combination of these two drawbacks makes the technology unattractive in that the value of the real estate occupied by these ponds in metropolitan locations coupled with the unsightliness of these ponds results in the individuals likely to be affected to gravitate towards other energy solutions. As indications of the thin commerciality of pond based solutions for micro algae, one company calls itself PetroAlgae while actually developing cyanobacteria to focus on lemna-based fuel otherwise known as duckweed. It is not microalgae nor macroalgae, but a small flowering plant that floats on water. Other companies pursuing micro algae have shifted to considering other markets for their algae having been convinced of the non-commerciality of their biofuel microalgae efforts.

Other prior artisans have focused on reducing the pollution or waste associated with energy production and other industrial applications. For the most part, these prior artisans have developed or modified processes to use recyclable materials or capture by-products (for other uses or scrubbing to remove harmful, polluting contaminants). With most raw materials, particularly those associated with energy production, at the end of the day there is simply a lot of waste product. In industries such as oil, coal, and nuclear energy production, the volume and problems attributable to the waste products is well known and the subject of countless, albeit to date somewhat unsuccessful, technologies to lessen, remove or convert these wastes. In other industries, such as mining and timber, efforts are made to end the harm to the ecosystem caused by the practices of strip mining and clear cutting. Taking a lesson from native Americans as renowned conservationists for using every part of a downed bison, these industries have been committed to finding alternative uses for its by-products and restoring the land to its natural state when practicable. However, as is well documented, these technologies suffer from the major drawback that these industries greatly affect the habitat and well-being of the indigenous animal species residing in these areas.

As clear from the foregoing, there is a need in the art for a safe, environmentally-friendly, regenerable, and non-depletable energy source that does not suffer from the problems and drawbacks of the prior art. Likewise, as clear from the foregoing, there exists a need in the art for technology that harvests natural resources in a manner safe to the habitat. Also, as clear from the foregoing, there exists a need in the art for industrial uses of a natural resource that utilizes the resource, it constituent parts, and its by-products in a variety of uses and in a manner that reduces waste.

The foregoing underscores some of the problems associated with prior art energy production and manipulation of natural resources. Furthermore, the foregoing highlights the long-felt, yet unresolved need in the art for reliable methods and means for safely harvesting, manipulating, and using natural resources in the production of energy or its conservation while reducing waste and pollution. The foregoing also highlights the long-felt, yet unresolved need in the art for reliable methods and means for using the by-products of an energy source or raw material in other industrial uses.

B. Kelp-Based "CleanTech"

The present invention overcomes the practical problems described above, satisfies the long-felt, yet unresolved needs in the art, and offers new advantages as well. To this end, the present inventors have found a clean, environmentally-friendly kelp technology that provides numerous new and useful products never thought possible by prior artisans. Specifically, the present inventors have discovered new and useful kelp-based products in conjunction with environmentally-friendly methods for acquiring, processing, refining and using these novel products. More particularly, the present inventors have come up with environmentally-friendly methods and means for harvesting kelp and processing it for use in various industrial applications including environmentally-friendly and energy saving lubricants, lubricant additives, biofuels, bio-based chemicals, oil remediation dispersants and sorbents, non-toxic health supplements, nutraceutical, cosmeceutical and pharmaceutical product ingredients, horticultural and aquacultural feed or supplements, and a recoverable source of trace elements.

The starting material, kelp, or "marine macroalgae," is classified into three broad groups[1] based on pigmentation and other characteristics: (1) Green—Chlorophyceae, (2) Brown—Phaeophyceae and (3) Red—Rhodophyceae. Red macroalgae come in a variety of shades of red due to additional red protein pigments. The red color is not uniform and some species are purple, mauve, orange or even yellow. These pigments allow the red algae to grow at far greater depths than the green and brown algae. Red algae can occur down to 200 metres. Green macroalgae get their colors from the photosynthetic chlorophyll pigments. They come in a variety of shapes including flat sheets, cylinders, strings of beads, spheres, or hair-like filaments. Green algae are common in the intertidal zones and shallow waters as well as some freshwater habitats where light is plentiful. Brown macroalgae have additional pigments which mask the green chlorophyll. These pigments allow the brown algae to extend their range down into deeper waters because the pigments are more efficient than green chlorophyll in absorbing the sunlight below the ocean's surface.

Brown algae includes *Laminaria japonica, Undaria pinnatifida, Macrocystis pyrifera, Alaria Fistulosa, Alaria Marginata, Fucus Evanescens, Laminaria Cichorioides, Laminaria digitata, Laminaria Hyperboria, Saccharina Latissima, Fucus Vesiculosus* and *Ascophyllum Nodosum*. Amongst these brown algae are the seaweeds of the colder Northern Hemisphere waters. Kelps, a member of this group, have 30 different genera and are the largest seaweeds known so far.

Green algae includes *Monostroma* and *Enteromorpha*; while red algae includes *Porphyra, Eucheuma, Kappaphycus* and *Gracilaria*. Red seaweeds contain around 550 species of algae making them the largest group, including the *Porphyra* species and *Pterocladia lucida* known for their use in agar production.

The world's top cultivated seaweed genera during the year 2000 were reported to be *Laminaria* (4.6 Million tons), *Porphyra* (1.01 Million tons), *Undaria* (0.3 Million tons), *Eucheuma* and *Kappaphycus* (0.63 Million tons) and *Gracilaria* (12.5 kilo tons). A study on the composition[2] of various macroalgae like *Gracilaria crassa, Ulva retticulata, Chaetomorpha crassa, Eucheuma denticulatum*, amongst others, revealed that macroalgae typically contain protein (15-20%), carbohydrate (20-30%), ash (20-35%), phosphorus and fiber (20-40%).

It has been known for centuries that kelp can be harvested[3] as a source of potash, algin, and more recently food additives. Giant bladder kelp or *Macrocystis pyrifera* is the easiest to harvest because it is found in deep water habitats, thereby allowing large harvesting boats to operate more easily; and its surface canopy lends itself to harvesting several times a year without disturbing the submerged vegetative and reproductive parts which are located below the harvesting levels, thereby ensuring the kelp will continue to reproduce and the surface canopy will be regenerated by the younger fronds growing below the surface. Macro algae can reach sizes of over 60 meters in length, unlike microalgae which are very small plant like organisms which can be seen through a microscope. In size, brown macro algae such as *Macrocystis pyrifera* are often referred to as the "Seqouia of the Seas" being the largest algaes in the world.

In the coastal waters of California, nearly 400,000 wet tons of kelp per year were harvested during 1917 and 1918 as a source of potash. The emphasis later shifted from potash to algin production in the late 1920's as a result of the discovery of algin by E. C. C. Stanford in 1883. To this day, kelp remains the principle source of algin but is now largely manufactured in non-US locations as US kelp/algin operations were shut down in 2005 due to poor algin economics. The harvesting of kelp in California is regulated by the California Department of Fish and Game with the protection and maintenance of the kelp beds remaining an important priority. Offshore kelp lease units have been well defined for offshore California, similar to the well defined offshore oil and gas leasing boundaries.

Prior artisans have used kelp for a variety of purposes. As previously mentioned, kelp is the primary source of algin. Algin is a highly efficient thickening, stabilizing, suspending and gelling agent. Algin is regularly used as an emulsifier to bind oily and watery fluids together and is used for this purpose to prevent salad dressings from separating in containers. It is also used as a "suspender" to keep pigment particles mixed with the carrier as in paints, cosmetics and pharmaceuticals. Also, algin aids in controlling viscosity and smoothing liquid and gel products. It is used to smooth and thicken more than 300 preparations from ice cream to paints, sauces and toothpaste and found in a wide range of foods including desserts, gels, milkshake mixes, dairy products, canned foods, salad dressings, cake mixes, and meringues. Notably, Algin's hydrophilic, colloidal properties are also useful in the manufacture of other foods, drugs, cosmetics and building materials.

In addition to algin production, giant kelp has also been used as a food supplement for many years because it contains iodine, potassium, other essential vitamins and minerals, as well as carbohydrates. In Asia, for decades, various lower quality kelps have been harvested for use with other ingredients for dietary supplements. There are a number of scientific studies using mice to test the health benefits of kelp for a variety of ailments. However, to date, these studies have not resulted in clinical trials of any significance.

As discussed above, kelp has been harvested for years for extracting and using alginates and other minor uses such as abalone feed and marine research. However, to date, there has not been any defined use for the non-alginate residue portion of the kelp. In fact, kelp slime and kelp residue after alginate extraction have traditionally been discarded or treated as waste. With current global potential of macroalgae resources in the range of 10 Million metric tons, the present inventors make use of kelp-slime, kelp residue, and kelp itself, in a variety of environmentally-friendly, energy saving, clean energy, and health beneficial products.

III. SUMMARY OF THE INVENTION

The present invention is based, in part, on the discovery that kelp-slime extracted from kelp provides the surprising and unexpected qualities of a superior, energy saving lubricant/drag reducing agent, and other by products, such as an oil dispersant for oil spill remediation (and wherein dried kelp may serve as a complimentary or stand alone oil sorbent). The present invention is also based, in part, on the discovery that kelp harvested and treated to extract slime, may be further treated and/or used in other useful industrial applications. Specifically, according to various advantageous embodiments of the invention, dried kelp may be fed, or extruded into kelp nuggets (biomass) then fed, into an energy conversion plant gasifier to produce biofuels such as synthetic diesel, jet fuel and naphtha. Alternatively, kelp may be used as a feedstock for a biorefinery using a pyrolysis method.

In accordance with some other embodiments of the invention, dried kelp and/or kelp-slime by-products will be treated and used as a source of Fucoidan for personal healthcare (e.g., foodstuffs, additives, supplements, cosmeceuticals, nutriceuticals, pharmaceuticals) and a source of organic farming growth nutrients (e.g., feed) for shrimp farms and livestock (animal/equine feed). In yet additional advantageous embodiments, the ash/residue from the energy conversion process may be treated to extrude trace elements such as arsenic for use in other products such as pesticides or herbicides.

An object of some embodiments of the invention is to harvest kelp in its natural environment without the use of man-made or operated ponds. A related object of the invention is to provide a method of harvesting kelp without adversely affecting the existing habitat.

An object of some embodiments of the invention is to extract slime/sieve sap from harvested kelp for use as, blending with, or the addition to lubricants for various industrial uses including refrigeration. A related object of the invention is to use kelp slime for its superior drag reducing properties. Other embodiments include use in cosmeceuticals and pharmaceuticals for inter-personal hygiene uses and medicated lubricants, and as inhibitory agents in virus protection.

An object of some embodiments of the invention is to harvest and treat kelp to extract Fucoidan for use in foodstuffs, additives, supplements, cosmeceuticals, nutriceuticals, pharmaceuticals in the personal healthcare and medical industries.

An object of some embodiments of the invention is to harvest and treat kelp to provide a cheap, clean source of organic farming growth nutrients (e.g., feed) for shrimp farmers and livestock owners.

Another object of the invention is to use kelp as a feedstock for a biorefinery for the production of biofuels, chemicals and bio-char using a pyrolysis method. Kelp (or macroalgae) can be pyrolyzed by itself or in combination with any of the following non-limiting added constituents: polymers, rubbers, crude oil and other feedstocks.

Yet another object of the invention is to efficiently sequester various trace elements and metals in kelp as part of bio-char product from the pyrolysis of kelp. The bio-char is used as soil amendment or fertilizer base. Optionally, some of the trace metals can be extracted for individual applications.

Another object of some embodiments of the invention is to use kelp as a feedstock for a biorefinery for the production of biofuels such as synthetic diesel, jet fuel and naphtha. A related object of yet other embodiments of the invention is to provide methods of washing, drying, extracting the chlorine and alkali from the dried kelp, and extruding kelp into nuggets for use in an energy conversion plant gasifier. For gasification, preferably, the kelp feedstock is mixed with a higher fixed carbon containing feedstock to improve energy efficiency.

Yet another object of the invention is to recover the ash/residue of the biorefinery for extracting arsenic and other trace elements for use in other industrial products and applications such as pesticides or herbicides.

Yet another object of the invention is to use kelp (or macroalgae) in an anaerobic digestion or fermentation process, wherein micro-organisms feed on kelp residue and produce gaseous products that can be used as biofuels, e.g. biogas, methane and hydrogen.

Given the following enabling description of the drawings, the method, means, and features of inventions disclosed herein should become evident to a person of ordinary skill in the art.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION

Figure 1:
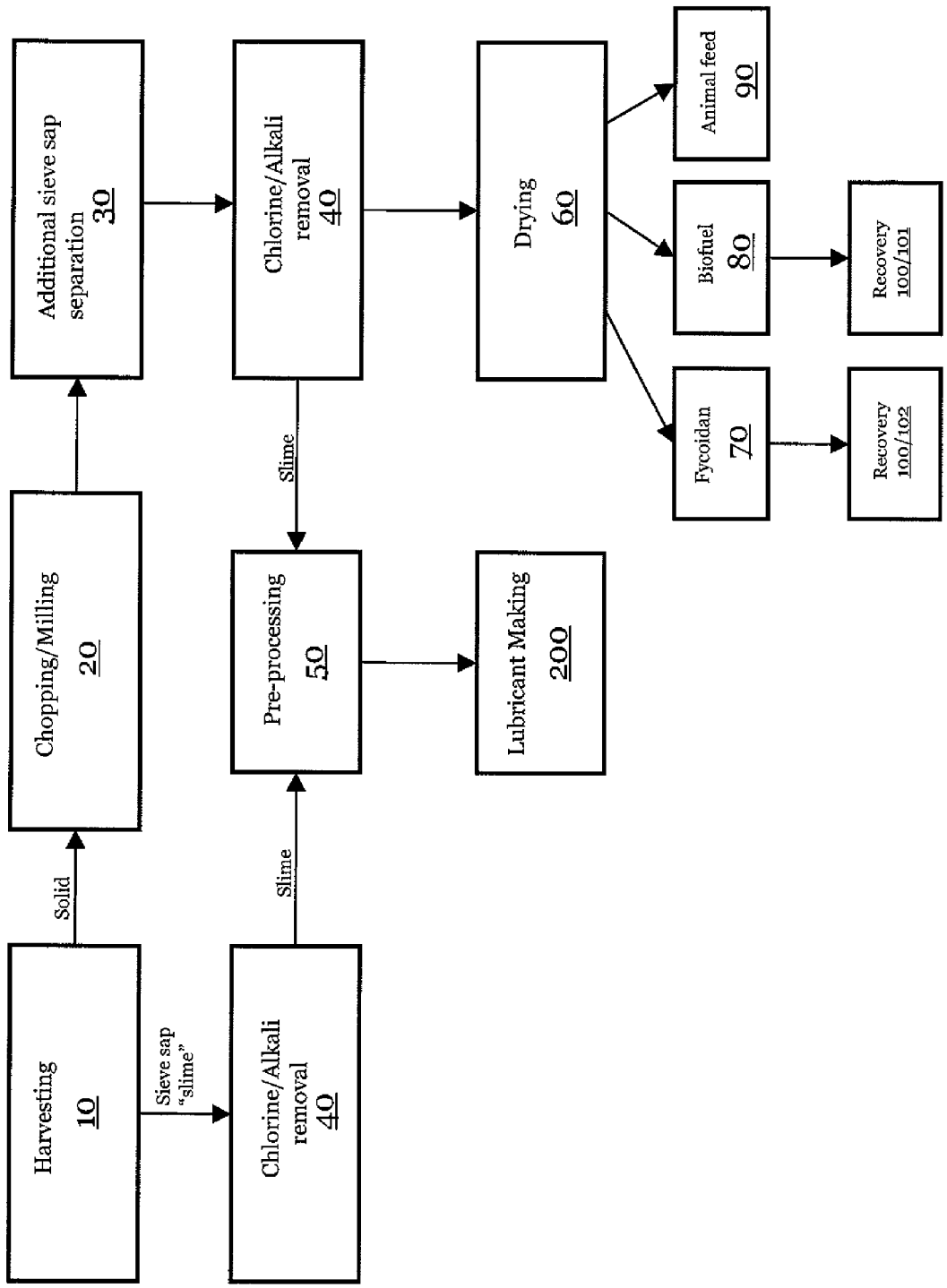
FIG. 1 is a block diagram generically illustrating the steps of a presently preferred prophetic embodiment of the invention showing the steps for using kelp according to various embodiments of the invention from harvesting the kelp through recovery of trace metals from its waste products.

While the present invention will be described in connection with the harvesting and use of kelp in the form of macro brown algae, *Macrocystis pyrifera*, one of ordinary skill in the art armed with the present specification should note that most if not all of the aspects of the technology discussed herein is applicable to almost any naturally-occurring kelp, including any of the known red, green or brown algae growing naturally offshore almost everywhere in the world; or at least easily confirmed for the potential uses discussed herein via routine experimentation.

As will become apparent to one of ordinary skill in the art upon reading the present specification, the present inventors have taken advantage of the fact that kelp, e.g., macro algae, is naturally occurring throughout the oceans of the world, require no man-made structures or ponds to cultivate, require no hands-on farming or treatment to grow, grow faster than almost every living thing on Earth, and can be cut (and allowed to re-grow) without impacting the ecosystem of which it is a part. As such, despite incredulity in the art that kept prior artisans from attempting to harness kelp as a feedstock for biofuels or for use as a lubricant, the present inventors have discovered the unexpected and advantageous features of using kelp, its constituents, and its waste or by-products as a starting material, additive or component used in a plurality of varied industrial uses. The kelp and kelp products of the present invention satisfy the long-felt, yet unresolved needs in the arts for a renewable, non-depleatable energy source as well as an environmentally friendly multi-use product with little or no waste product.

Of particular note, the present inventors went against the great weight of authority and the teachings in the art in extracting and collecting kelp slime/sieve sap in the first place. As will be appreciated, prior artisans cultivating kelp have for centuries discarded kelp slime/sieve sap as a waste product. Accordingly, the collection and use of kelp slime/sieve sap aspect of Applicants' invention is the antithesis of traditional kelp technology in that kelp slime/sieve sap is not only collected at harvesting, but residual slime/sieve sap is also collected during the on-shore draining and drying process. The collected kelp slime/sieve sap is then used as a lubricant or constituent of a lubricant composition as describe in more detail herein, despite the incredulity in the art that kelp slime/sieve sap has any redeeming value.

Moreover, the lubricants of the present invention not only possess unexpectedly superior lubricant properties, but also provide residual and unexpected benefits when used in various systems, consumer products, and other applications.

In addition, the present inventors discovered that kelp, and in particular, macro brown algae, *Macrocystis pyrifera*, and other brown algae, such as *Laminaria japonica* (and two other *Laminaria* algae) are not only a great source of Fucoidan, but also capable of being processed to a purity of between 85-90%, or even medical grade purity. These purities, never thought achievable, allow the kelp of the present invention to serve as the starting material for Fucoidan powders and the like to be used in medicinal and therapeutic products, as dietary supplements, and as ingredients for cosmeceutical and nutriceutical applications.

Various aspects of the present invention and its various new and novel features are depicted for reference generally in the exemplary and non-limiting flow diagram of FIG. 1. While provided for ease of comprehension and reference, FIG. 1 should not be construed as limiting the present invention to a particular process or order of steps, nor should it be construed as a limitation of the invention as requiring all of the steps and processes to be performed. In addition, the inclusion of FIG. 1 is not an admission that all of the steps and processes are necessary to depart novelty to the present invention or an indication that each step, product, or process is not distinctly patentable in isolation.

In its most basic form and according to a presently preferred embodiment, an advantageous aspect of the present invention involves the extraction of brown algae sieve sap, or brown algae "slime," from the harvesting process of brown algae. The kelp is harvested using kelp harvester boats, preferably followed by extraction of any chlorine content (although not required), to produce a new form of lubricant that can be used as a drag reducing agent and/or as a natural algae "synthetic" lubricant alternative ("NASL"). According to the invention, the lubricant may comprise 100% pure sieve sap (NASL) as the sole lubricant ingredient, or alternatively, be used in various concentrations to yield multiple blends by scaling down the NASL content to any effective percentage (as low as 1% sap) for the intended use.

According to a presently preferred embodiment, the lubricants are preferably used in two distinct and separate applications: 1) use with existing and new refrigerants used today for compressors to replace the R22 standard, such as Polyol Esters, (POE) Polyalkyl glycols (PAG), Polyalkyl benzenes (PAB), Polyalphaolefins (PAO) and Polyvinyl ethers (PVE) to enhance their performance in compressors in any industrial application, and 2) used as a component mixed in any ratio from about 1% or higher, for use with refrigerants such as R410a or the like for any of the full spectrum of global refrigerants and heating systems.

According to another aspect of at least one embodiment of the invention, the new NASL may also be blended with mineral oil or similar compounds for use in older systems being phased out today to perform the same lubrication and drag reducing functions of other embodiments of the invention.

According to yet another aspect of at least one embodiment of the invention, the non-toxic and potentially therapeutic nature of the new NASL may be used in the personal lubricant, massage gel, and lifestyle/therapeutic oil market and products. While the advantages of the organic nature of the lubricant and its safety are new readily appreciated, the potential additional therapeutic benefits of the Fucoidan content are also noteworthy. As will be understood by those of ordinary skill in the art, kelp, trepang, seaweed, and the like are harvested and dried to extract Fucoidan. While not accepted in all scientific circles, Fucoidan is known to have the unexplained phenomena of providing numerous health benefits ranging from being a source of food nutrients, to healing/protecting the organs of the body, to curing cancer, and to have anti-aging, skin protecting qualities, including use as an anticoagulant, and encouraging thermogenisis. According to this aspect of the invention, one particularly advantages feature of the lubricant of the present invention is its antiviral properties and its deployment with condoms to protect against the transmission of viruses such as herpes and HIV.

According to yet another advantage feature of some embodiments of the invention are the use of kelp slime as an oil dispersant and dried kelp or kelp residue as an oil sorbent in oil remediation operations.

In achieving these aspects of the various embodiments of the invention disclosed herein, the methods, means, and processes require the harvesting and treatment of the kelp is a safe and efficient manner as discussed in more detail below.

Algae Harvesting and Slime Extraction

Figure 2:
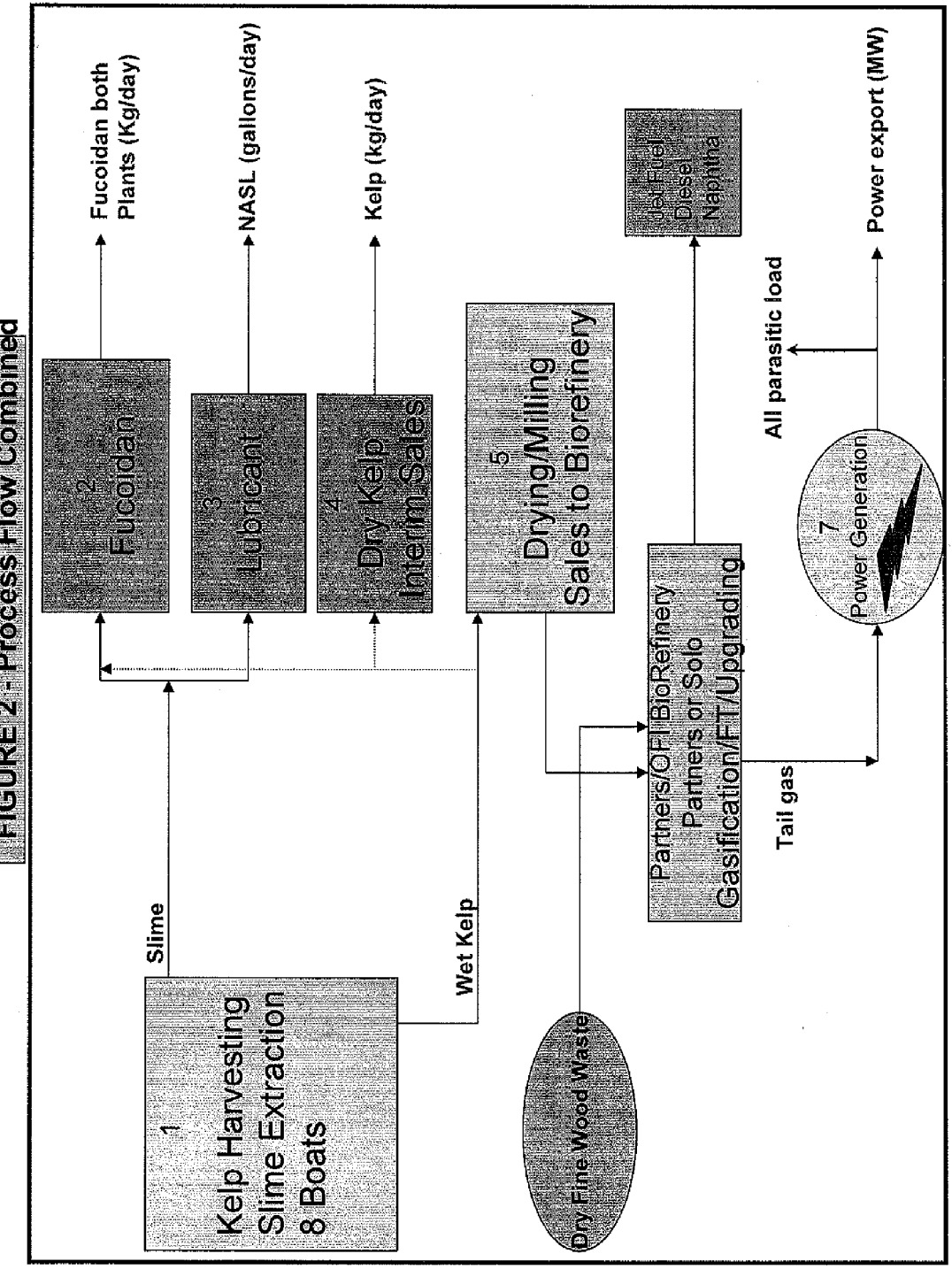
FIG. 2 is a more detailed block diagram illustrating the steps of a presently preferred prophetic embodiment of the invention showing the steps in the multi-use kelp application of the present invention.
Figure 3:
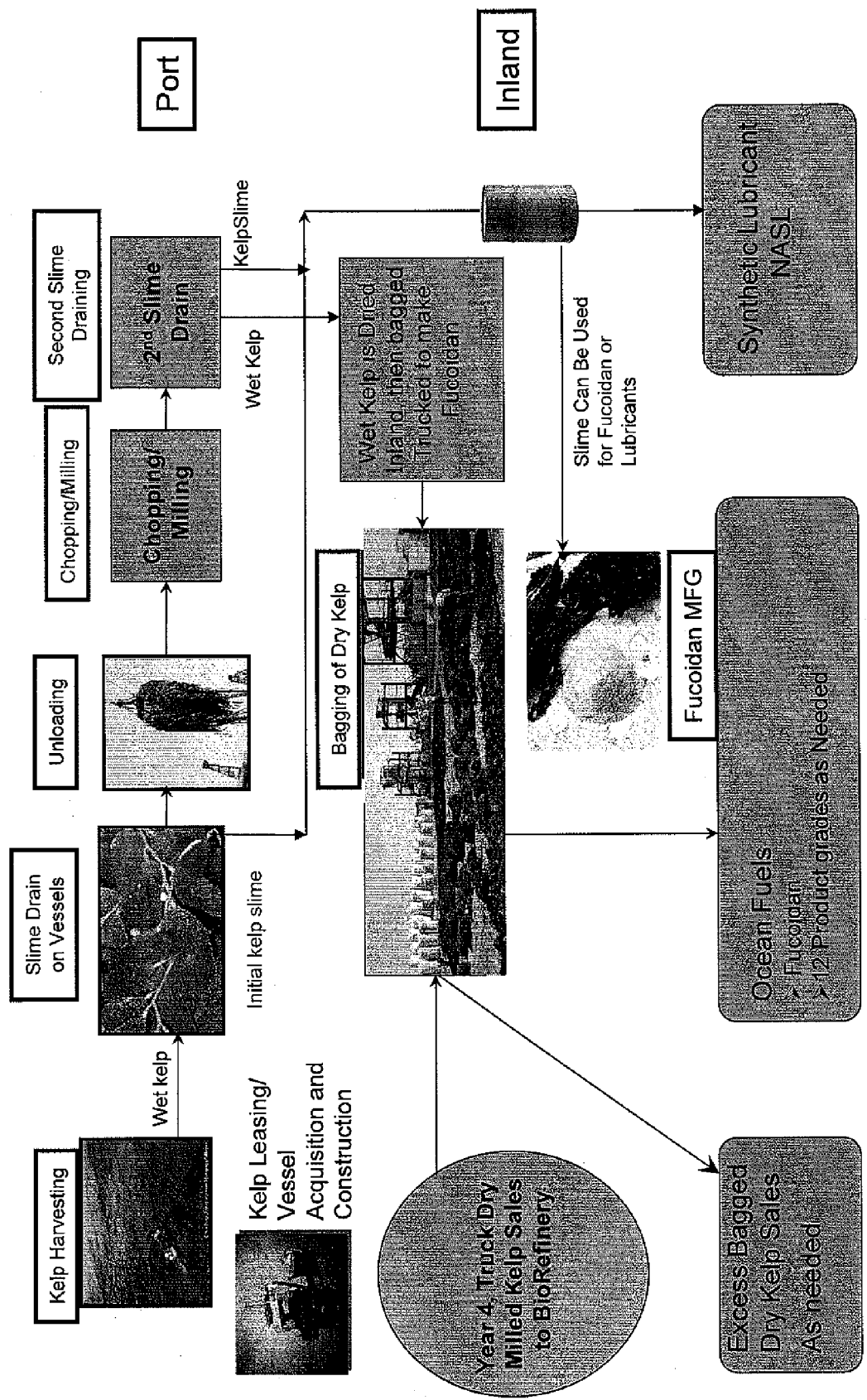
FIG. 3 is a process flow diagram illustrating a presently preferred prophetic embodiment of the invention depicting the use of kelp in various industrial applications.

In a preferred embodiment, as depicted in FIGS. 1-3, the invention involves the initial step of harvesting of kelp 10 (macro algae brown, red or green) with the dual/joint collection of the algae and its sieve sap for commercial use in a plurality of separate products. As depicted generically in FIG. 1, according to this embodiment of the invention, both the sieve sap and wet brown algae solid matter are jointly harvested, with separation of both products occurring aboard customized kelp harvesting vessels having a separate sieve sap receptacle for unloading on docking. In a preferred embodiment, this technology captures the sieve sap from the harvested core macro algae.

Chopping/Milling.

When kelp is harvested, it is typically cut and taken aboard in 20 to 50 foot strands. Once on land, the kelp is preferably cut into smaller more manageable pieces in a chopping/milling step 20. Typically, the kelp is chopped into one to two foot segments. However, for various applications, it is milled into 3 or 4 inch squares.

Further Slime Extraction.

As also depicted in FIGS. 1 and 2, preferably, on arrival at the unloading docks, an additional sieve sap separation step 30 of the wet brown algae occurs before, after, or during unloading and chopping/milling of the harvested core macro algae (to create smaller sizes of the wet algae as described above). The chopped algae product is preferably then stored in a second stage drain to collect any additional sieve sap to insure an optimal/maximum amount of sieve sap is collected from each shipload.

Removal of Chlorine and Alkali.

Although depicted on FIG. 1 as occurring after drainage, the removal of chlorine step 40 and alkali may occur, if at all, elsewhere in the process, but preferably before drying. In any event, as depicted generically, the combined sieve sap or brown algae "slime," (in this embodiment the brown algae *Macrocystis pyrifera* sieve sap of kelp growing offshore the Pacific Ocean) and the physical *macrocystis pyrifera*, are preferably both further processed to extract any chlorine or alkali. The removal of chlorine and alkali, while not critical, is generally deemed important because these materials may corrode stills, parts, and machinery exposed to the untreated kelp. This is particularly true when dried kelp is to be used as a feedstock for a biorefinery. Chlorine, alkali and there corrosive affects are detrimental to the biorefinery and to be completely avoided to the extent possible.

Slime Collected, Combined and Sent for Further Processing.

Both sources of sieve sap are preferably combined in a pre-processing step 50 as depicted in FIG. 1. It is expected that 1,000 gallons of brown algae sieve sap can be recovered per vessel per trip—500 gallons from the initial on-board separation and an additional 500 gallons during the land-based chopping, milling and residual draining. During the pre-processing step 50, the collated sieve sap is trucked, shipped, piped or otherwise sent for use as the starting material or additive for industrial lubricants and oils.

Drying Solid Plant.

The solid wet plant (preferably after chopping and/or milling), in this example, *Macrocystis pyrifera*, is then sent to a land drying location for the drying step 60. In a presently preferred embodiment, wet kelp is shipped in trucks to a drying area and air dried on concrete slabs. After drying, it may be further processed to extract chlorine and alkali or residual chlorine and alkali left from a first extraction. Post extraction and drying, the dried kelp is then scooped up by a machine and bagged or otherwise gathered for processing or use in other industrial applications.

Dry Kelp Uses—Fucoidan.

As depicted in FIGS. 1 and 2, dried kelp may be sent to a facility and processed into Fucoidan 70. In a presently preferred embodiment, the Fucoidan of the present invention is processed into a purity of between 85-90% or better (e.g., medicinal grade), and serves as the precursor to powders, additives, and capsules for personal health and medicinal products. Fucoidan of this purity is generally recognized as unnecessary and unachievable. However, the present inventors contemplate high-purity Fucoidan for atypical uses (met with incredulity in the art) and uses which allow its waste or by-products to be mined for other or downstream uses.

Dry Kelp Uses—Biofuel Feedstock.

As depicted in FIGS. 1 and 2, dry kelp not used for Fucoidan may be used as a biofuel feedstock 80. Chopped/milled kelp may be fed to the biorefinery, or alternatively, dried kelp may be extruded into 3 inch, low moisture nuggets to form it into an optimal biofuel feedstock for use in the process of making diesel, jet fuel, naphtha and/or electricity. In addition, and keeping with the multi-use aspect of certain embodiments of the invention, the residue/waste of the kelp feedstock may be recovered and processed to recover trace elements, such as arsenic, for use in other products such as pesticides or herbicides.

Additional Uses—Processing of Residues/Source of Trace Metals.

Although only depicted, generically in the Figures, as alluded to above, the residues/waste products may be processed or recovered for other uses in a "recovery step" 100 (for lack of a better phrase). For example, the resultant ash from use of kelp as a feedstock of a biorefinery may be harvested and separated to recover trace elements 101 such as arsenic for use in the manufacturing of pesticides and the like. Likewise, the residue from Fucoidan manufacturing may be recovered and sold for use in the horticultural industry 1023.

Figure 4:
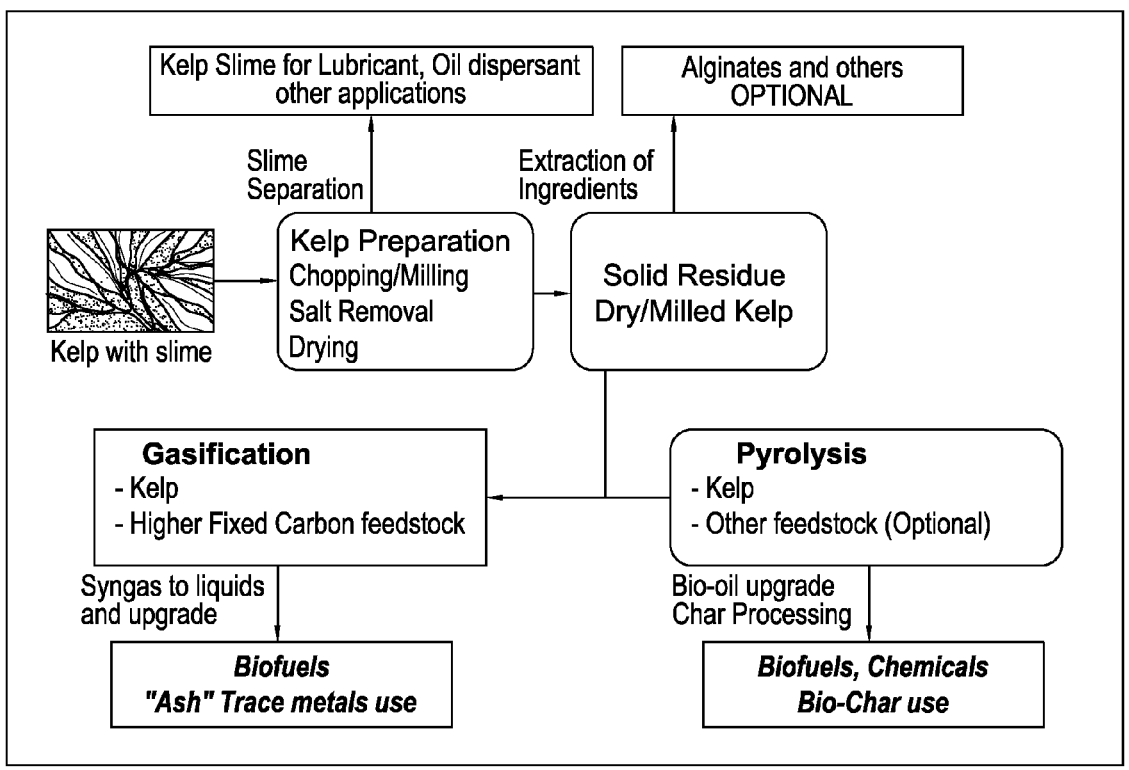
FIG. 4 is a process flow diagram illustrating a presently preferred prophetic embodiment of the invention depicting the use of kelp in biofuel production.

Turning now to FIG. 4, there is depicted a process flow diagram for a presently preferred embodiment of the invention for using kelp as a biofuel source. As shown in the Figure, the kelp may be used in a gasification process and/or a pyrolysis process to achieve the biofuel and related aspects of the invention.

Kelp (or Macroalgae) Based Biofuels—Pyrolysis and Gasification

In a general way FIG. 6 delineates the process steps for kelp (or macroalgae) to be used to manufacture biofuels and a range of other useful products (e.g. electricity, bio based chemicals, bio-char).

The use of kelp as a biofuel source is more than theoretical. In the prior art, Cribb (1953) gave an account of the taxonomy and distribution of *Macrocystis* in Australian waters on the east coast of Tasmania[6]. Analyses of monthly samples of *Macrocystis* show an average alginic acid content of approximately 21 percent and an average mannitol content of approximately 8.7 percent on a dry-weight basis.

Park et al. (2009) produced hydrogen from various marine macro-algae (seaweeds) through anaerobic fermentation using an undefined bacterial consortium[7]. In this study, anaerobic fermentation from various marine macro-algae for *Ulva lactuca, Porphyra tenera, Undaria pinnatifida*, and *Laminaria japonica* was studied. From this analysis *Laminaria japonica* was determined to be the optimum substrate for hydrogen production.

Suzuki and Iwata (1990) used a non-destructive photon activation analysis technique[8] on two brown algae, *Laminaria religiosa* and *Sargassum horneri*, and one red alga, *Heterosiphoia japonica*. Elemental abundances of nine elements including arsenic and phosphorous were determined.

Zhou et al. (2010)[9] converted marine macroalgae *Enteromorpha prolifera*, one of the main algae genera for green tide, to bio-oil by hydrothermal liquefaction in a batch reactor at temperatures of 220-320° C. The liquefaction products were separated into a dichloromethane-soluble fraction (bio-oil), water-soluble fraction, solid residue, and gaseous fraction. The higher heating values (HHVs) of bio-oils obtained at 300° C. were around 28-30 MJ/kg. The bio-oil was a complex mixture of ketones, aldehydes, phenols, alkenes, fatty acids, esters, aromatics, and nitrogen-containing heterocyclic compounds. Acetic acid was the main component of the water-soluble products.

Ross et al. (2008) compared the pyrolysis behavior of a number of brown macroalgae (seaweeds) collected in the UK such as *Laminaria hyperborea* and *Fucus vesiculosus* with tropical algae *Macrocystis pyrifera*[10]. Macroalgae contain a significant amount of alkali earth metals, halogens and a range of trace heavy metals. Pre-treatment of the algae was performed to remove mineral matter in both water and weak acid. The pyrolysis behavior of the residues was investigated and the effect of processing on ash content and mineral composition has been determined. The residues from pre-treatment have different pyrolysis behaviors, particularly after acid treatment. The pre-treatment schemes investigated can remove a significant proportion of the mineral matter and halogens although they also selectively extract polymeric material. There appears to be potential for the production of fuels and chemicals from brown algae by pyrolysis although the reduction of mineral matter and halogens by pre-treatment is advantageous.

In another study by Ross et al. (2008), a preliminary classification of five macroalgae from the British Isles; *Fucus vesiculosus, Chorda filum, Laminaria digitata, Fucus serratus, Laminaria hyperborea,* and *Macrocystis pyrifera* from South America, were presented in terms of a Van Krevelen diagram[11]. The macroalgae have been characterised for proximate and ultimate analysis, inorganic content, and calorific value. The different options for thermal conversion and behavior under combustion and pyrolysis have been evaluated and compared to several types of terrestrial biomass including Miscanthus, short rotation Willow coppice and Oat straw. Thermal treatment of the macroalgae has been investigated using thermogravimetry (TGA) and pyrolysis-gc-ms. Combustion behavior is investigated using TGA in an oxidising atmosphere. The suitability of macroalgae for the different thermal processing routes is discussed. Ash chemistry restricts the use of macroalgae for direct combustion and gasification. Pyrolysis produces a range of pentosans and a significant proportion of nitrogen containing compounds. High char yields are produced.

Li et al. evaluated the pyrolytic and kinetic characteristics of two macro-algae (*Laminaria japonica* and *Sargassum pallidum*) and sodium alginate.[12] The results indicated that three stages appeared during pyrolysis, moisture evaporation, primary devolatilization and residual decomposition. Calculation of the most probable mechanism function of zone I of the two macro-algae indicated that alginate was mainly decomposed during zone I.

Aresta et al. (2005) compared two different techniques for the extraction of biodiesel from macroalgae[13]: the thermochemical liquefaction and the extraction using supercritical carbon dioxide (sc-CO2). The first allows to use wet material, while sc-CO2 requires dry material and uses moderate temperature and pressure so that it can be useful for the extraction of thermolabile compounds which may decompose at the temperature at which thermal methods are carried out. In both cases the extracted oil was characterized quantitatively and qualitatively. The novelty of the work is that in the literature the use of macroalgae for the production of biodiesel has not so far been described, while they are used mainly as food or other purposes.

Pyrolysis Technology[14]

A recent report by the National Renewable Energy Laboratory (NREL) provides a broad perspective of pyrolysis technology as it relates to converting biomass substrates to a liquid "bio-oil" product and a detailed technical and economic assessment of a modular fast pyrolysis plant. The relevant issues that are important to advancing pyrolysis technology to commercialization include:

1) Technical requirements to effect conversion of biomass to high yields of liquid bio-oil
2) Reactor designs capable of meeting technical requirements
3) Bio-oil stability issues and recent findings that address the problem
4) Product specifications and standards need to be established
5) Applications for using bio-oil in existing or modified end use devices
6) Environmental, safety, and health issues.

The principal technical requirement is to impart a very high heating rate with a corresponding high heat flux to the biomass. The reactor designs capable of achieving this requirement are the Fluidized beds (both bubbling and circulating), Ablative (biomass particle moves across hot surface like butter on a hot skillet), Vacuum and Transported beds without a carrier gas. Of these designs, the fluidized and transported beds appear to have gained acceptance as the designs of choice for being reliable thermal reaction devices capable of producing bio-oil in high yields.

Ross and co-workers (2010)[15] have prepared biochars by slow pyrolysis of several brown macroalgae, viz. *Laminaria digitata, Laminaria Hyperboria, Saccharina Latissima, Fucus Vesiculosus* and *Ascophyllum Nodosum*. Biochars were prepared at 300-500° C. at a heating rate of 20° C. min$^{-1}$. During pyrolysis at 500° C., they observed that some metals were partially lost by volatilization such as As, Cd, Cr, Ni, Pb and Se. The loss of metals was reduced at lower temperatures. Pyrolysis of macroalgae produced a gaseous fraction and a bio-oil. The gaseous fraction contained mainly $H_2$, $CH_4$, $CO$ and $CO_2$ (typically 25 wt % at 500° C.). The bio-oil contained a complex mixture of hydrocarbons including toluene, pyrroles, styrene, ethanone, benzenes, phenols, cresols, nitriles, indoles and long chain alkanes. It was also observed that high levels of alkali earth metals promote higher char yields.

Biomass pyrolysis oil is a greenhouse-gas-neutral, renewable resource that is produced when biomass is rapidly heated in the absence of oxygen. The oil can be combusted in industrial burners and furnaces for power and heating or further refined into transportation fuels such as gasoline, diesel and jet fuel. However, the oil is acidic (corrosive) and its viscosity increases over time making the substance unstable, which limits storage and transportation options, as well as its compatibility with some industrial equipment[16]. The stability of the bio-oil product is critical to the design of end use devices such as burners, internal combustion (IC) engines, and turbines. There is a need to develop economically viable technology to stabilize pyrolysis oil from second generation biomass feedstocks for use as a renewable fuel source. Furthermore, specialized catalytic reactor technology and catalytic de-oxygenation methods may need further advances to convert bio-oil to drop-in gasoline, diesel or jet fuel and to make the processes robust and viable in large scale[17].

Based on the Aquatic Species Program annual report (1984)[4], Natural Macroalgae on a dry basis contain approximately 58% Carbohydrates (Cellulose, Sugars and Starch), 12% Proteins, 3% Lipids and 27% Ash (with Minerals and trace metals). The cell walls of brown algae contain cellulose, alginates, sulfated fucans, and protein. Alginates form the dominant structural compounds of the cell wall and the intercellular matrix. With minor amounts of lipid contents, Marine algae do not contain any lignin. One of the few exceptions is *Calliarthron cheilosporioides*. Martone et al.[5] report the discovery of secondary walls and lignin within cells of the intertidal red alga *Calliarthron cheilosporioides*. Table 1 shows proximate and ultimate analyses of air dried (As received) and dry kelp (*Macrocystis Pyrifera*). Typically, harvested wet kelp has a high water content that can be reduced to desired levels (5-10%) by drying it on land (step 60, FIG. 1).

TABLE 1

Elemental Analysis of Kelp (Proximate and Ultimate)

| % | As Received | Dry |
|---|---|---|
| PROXIMATE ANALYSIS - KELP | | |
| Moisture | 7.47 | 0.00 |
| Ash | 42.22 | 45.63 |

TABLE 1-continued

Elemental Analysis of Kelp (Proximate and Ultimate)

| % | As Received | Dry |
|---|---|---|
| Volatile | 45.67 | 49.36 |
| Fixed Carbon | 4.64 | 5.01 |
| Total | 100.00 | 100.00 |

Energy content

| | | |
|---|---|---|
| Btu/lb (HHV) | 3711.00 | 4010.00 |
| MMF Btu/lb | 6806.00 | 7897.00 |
| MAF Btu/lb | | 7376.00 |

ULTIMATE ANALYSIS - KELP

| | | |
|---|---|---|
| Moisture | 7.47 | 0.00 |
| Carbon | 22.38 | 24.19 |
| Hydrogen | 2.85 | 3.08 |
| Nitrogen | 2.42 | 2.62 |
| Sulfur | 0.65 | 0.70 |
| Ash | 42.22 | 45.63 |
| Oxygen* | 22.01 | 23.78 |
| Total | 100.00 | 100.00 |
| Chlorine** | 14.47 | 15.63 |

*Oxygen by Difference
**Not usually reported as part of the Ultimate Analysis

Based on the proximate analyses, an advantageous aspect of kelp is it's fixed carbon content. Kelp contains ~5% fixed carbon, which is low and distinctly different than the fixed carbon content of land based biomass (typically >15%). Fixed carbon is the partially or completely oxidizable carbon that does not volatilize when simply heated. A higher fixed carbon content is more favorable for gasification since it provides exothermic heat from partial oxidation to the process and a lower fixed carbon with a higher volatiles percentage is more favorable for pyrolysis.

In addition, another advantage of kelp is the hydrogen to carbon (H/C) ratio in Kelp. This ratio (~0.13) is higher than average H/C for land based biomass (~0.12) by approximately 5%. Average data on H/C ratios and fixed carbon for land based biomass were taken from the DOE website: http://www1.eere.energy.gov/biomass/feedstock_databases.html. Since hydrogen as a fuel has the highest energy content per unit weight, even a 5% excess H/C ratio can result in a higher energy content product (vapors or gases) with a smaller carbon footprint.

Another advantageous aspect of kelp (macroalgae) is the absence of lignin. While reflected somewhat in the low fixed carbon content, lignaceous components of biomass are difficult to gasify or pyrolyze. During gasification, although they can partially oxidize and provide sustaining heat for the process, they predominantly affect tar formation and substantial process modifications (or additional unit operations) are needed to reduce or eliminate tars. Under pyrolysis conditions, lignins do not crack effectively unless substantial process modifications (e.g. very slow pyrolysis) are made. The absence of lignin makes kelp an ideal feedstock for pyrolysis. Yet another advantage of kelp feedstock during pyrolysis is the ease in handling of ash, minerals and recovery of trace elements. During pyrolysis, trace elements and metals are effectively sequestered within the bio-char product. The bio-char can be directly used as soil amendment or fertilizer or individual trace metals can be extracted for their applications. If extracted, based on the elemental analysis of kelp ash—for every 1000 tons of kelp processed, there is a potential to recover 37 Kg of Arsenic, 12 Kg of Barium and 13 Kg of Chromium and similar quantities of Cadmium and Lead.

TABLE 2

Elemental Analysis of Kelp Ash and Metal concentration

Elemental Analysis of Ash (%)

| | |
|---|---|
| $SiO_2$ | 0.57 |
| $Al_2O_3$ | <0.01 |
| $TiO_2$ | <0.01 |
| $Fe_2O_3$ | 0.07 |
| CaO | 3.04 |
| MgO | 2.94 |
| $Na_2O$ | 13.80 |
| $K_2O$ | 36.80 |
| $P_2O_5$ | 2.50 |
| $SO_3$ | 3.29 |
| Cl | 38.29 |
| $CO_2$ | 0.24 |
| Total | 101.54 |

Metals in Ash - KELP

| Metal | mg/Kg |
|---|---|
| Arsenic | 88.00 |
| Barium | 28.00 |
| Cadmium | 10.00 |
| Chromium | 30.00 |
| Lead | 10.00 |
| Mercury | <0.01 |
| Selenium | <2 |
| Silver | 2.00 |

A large portion of kelp ash occurs as salts (e.g. KCl, NaCl) which can be separated prior to pyrolysis or gasification. The high volatile content combined with low fixed carbon and optimization on process conditions provide for easy separation of ash (including minerals, oxides and trace metals) from the organic content during pyrolysis and sequestered as part of bio-char.

With the energy content of the organic portion (~7900 btu/lb on a dry basis) of kelp similar to that of land based biomass feedstocks, the contrasting differences occur in the volatiles, fixed carbon and ash contents. The above mentioned advantages of kelp make it a particularly useful feedstock for pyrolysis. In case of gasification, it is more preferable to have kelp mixed with other high fixed carbon containing biomass feedstocks to optimize energy utilization and efficiency. Upon gasification and gas clean-up, one possible way to convert syngas to liquid fuels is by using Fischer-Tropsch process followed by upgrading the FT product to jet fuel, diesel, naphtha and other useful chemicals. An example of a commercially available Biomass-to-Liquids process (Gasification and FT process) that is adaptable for the kelp containing biomass feedstock is the Silva-Gas Rentech process (Rentech, Inc.) with upgrading to final products provided by UOP (A Honeywell Company).

Figure 5:
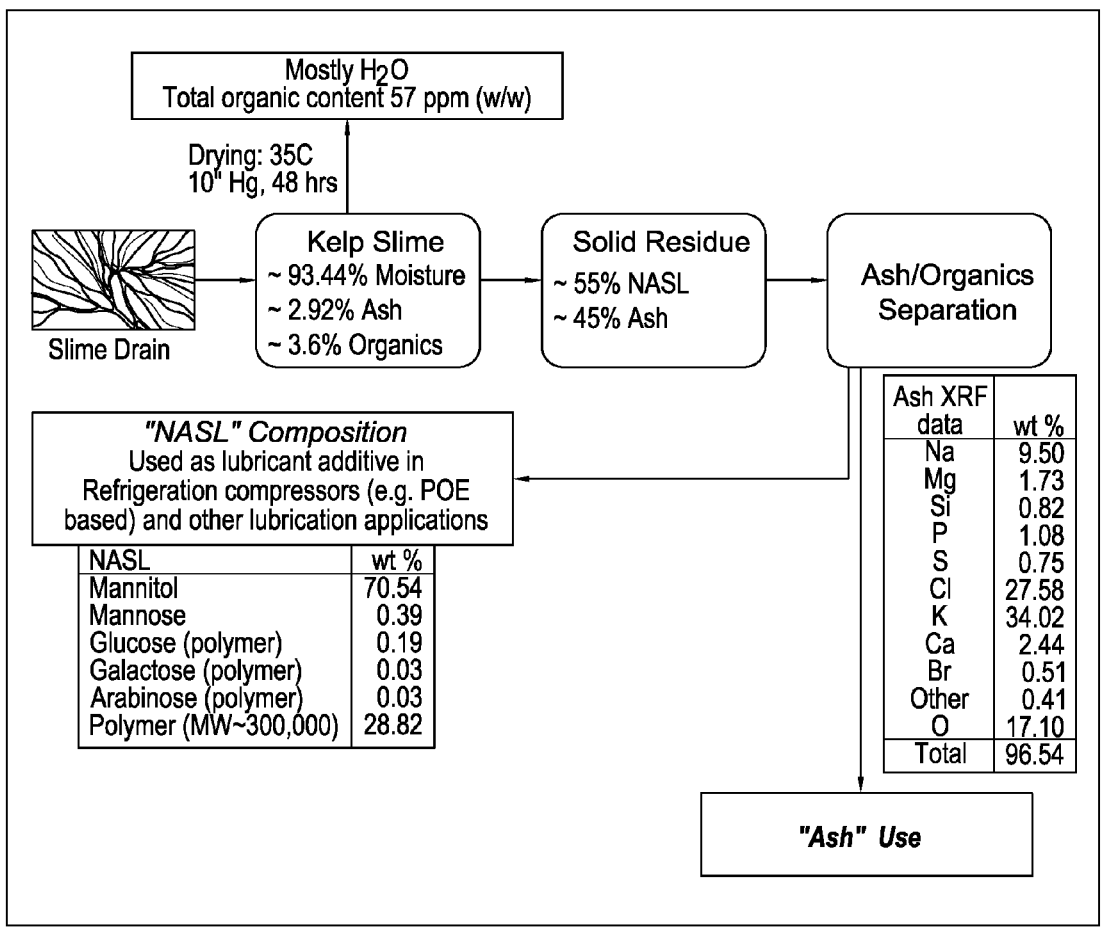
FIG. 5 is a process flow diagram illustrating a presently preferred prophetic embodiment of the invention depicting the use of kelp in lubricant production.

Turning now to FIG. 5, there is depicted a process flow diagram for a presently preferred embodiment of the invention for harvesting and using kelp-slime as a lubricant, lubricant additive, or drag reducing agent.

Kelp Slime Lubricant

Returning to the extracted kelp slime, as shown in the Figures, the kelp slime is used in the lubricant making step 200. The unexpected and superior ability of kelp slime for use in, or as, a lubricant is an advantageous discovery of the present inventors that achieves many of the needs, and overcomes many of the drawbacks, in the art. Although not wishing to be bound by theory, the present inventors believe that kelp slime's unexpected and advantageous properties as a lubricant are highlighted by its natural occurrence, its abundance around the globe, its ease of harvesting and replenishment, and its advantageous and heretofore untapped physical attributes.

Based on Manley (1983)[18], kelp slime is composed of organic and inorganic compounds. Major Organics include Mannitol, a polyol with chemical formula $C_6H_8(OH)_6$ (~65%), Amino acids with a monomeric formula $H2NC(R)HC(=O)OH$ (~15%), and Proteins or chains of amino acids (~1%). Inorganics include cations $K^+$ (~6.3%), $Na^+$ (~1.3%), $Mg^{2+}$ (~0.1%), Boron (~0.2%), anions $Cl^-$ (~7.3%), $I^-$ (~0.4%), $Br^{2-}$ (~1%) and other trace elements.

Despite detailed analysis of kelp slime by prior artisans, there is no teaching or suggestion any where in the art to suggest kelp slime could operate as a lubricant. The work of the present inventors in developing the present invention goes against the weight and credulity of the art. In fact, as previously mentioned, prior artisans generally considered kelp slime to be a by-product of kelp harvesting to be discarded.

As for the lubricant aspect of the invention, as will be appreciated, the main purpose of a lubricant is to lubricate the compressor, reduce friction, prevent wear and act as seal between high and low pressure sides. The ability of the lubricant to provide good lubrication to the internal moving parts within the compressor and be compatible with the working refrigerant is crucial for both the system performance and long-term durability. In hydrodynamic lubrication (HD), where contact surfaces conform geometrically, only the lubricant viscosity governs friction and lubricant film thickness. In this region, which is typical of many bearing and piston surfaces, the contact surfaces are completely separated by the lubricant film and nominal contact pressures are low (<50 MPa).

The lubricant film thickness varies with the same dependence on operating parameters, such as speed, shear rate, and applied force, as the viscosity for this region. This makes the correct choice of lubricant viscosity become an important issue in the HD region. Low viscosity may lead to solid contact, while too high viscosity leads to an increase in frictional losses resulting in increase motor loading and higher power consumption. In regions of elastrohydrodynamic lubrication (EHD), such as bearings or gears with high-pressures loadings, additional lubricant properties such as pressure-viscosity coefficient and limiting shear stress come into play.

Temperature plays a critical role in both the HD and EHD regions because of its strong effect on the viscosity of a lubricant. In typical air conditioning (A/C) or refrigeration systems, both of these regions of lubrication may be encountered. The maximum pressure attained in the refrigeration system can be as high as 2.5 GPa, indicating operation well into full developed elastohydrodynamic or boundary lubrication regions.[19] Here, the thermophysical properties of the lubricant that become important are molecular conformability and resistance to physical degradation.

Detailed theoretical calculations predict that energy efficiency performance of most compressor types will be dominated by losses arising from lubricant transport and friction losses, and that the most significant impact on energy efficiency would be obtained by reducing the lubricant viscosity. However excessive reduction in viscosity is a concern as the lubricant may not be able to provide sufficient film strength for separation of the moving parts, leading to increased wear and failure. Overall viscosity contributes to viscous losses (heat), with substantial frictional losses occurring in the boundary layer near the surface of metal parts.[20] According to one object of this aspect of the lubricants of the present embodiment is to use kelp slime as a drag reducing agent that locates itself in the boundary layer to minimize the frictional losses while at the same time allow the bulk lubricant to have high enough viscosity (and elasticity) to provide effective lubrication and separation of metal surfaces.

The lubricant structure plays a much more important role for the well being of rolling elements in refrigeration compressors. The extent of wear depends on whether the lubricant chains are branched, contain short acid chains or long linear acids, but the wear process is believed to be caused by thermal decomposition of the lubricant in the presence of steel (corrosive decomposition products attacking the bearing steel).[21] The kelp slime drag reducing agent of the present invention is expected to minimize the local heat build-up and prolong the wear life of all metal components the lubricant is in contact with.

Lubricant Applications

The kelp slime lubricant aspect of the present invention is more than theoretical. One of ordinary skill in the art armed with the present specification and the knowledge of the relevant art will be able to practice this aspect of the invention with no more than routine experimentation following the principles disclosed herein. As for relevant art, U.S. Pat. No. 5,744,434[22] discloses a synthetic ester composition which exhibits superior thermal and oxidative stability, lower friction coefficient and lower wear in Polyol ester based lubricant compositions wherein the synthetic ester composition has between 5-35% unconverted hydroxyl groups (based on the total amount of hydroxyl groups).

U.S. Pat. No. 5,773,391[23] discloses polyol ester compositions derived from polyols and aliphatic monocarboxylic acid mixtures derived from natural vegetable oils wherein the acid mixtures comprise at least about 72% by weight of oleic acid that can lead to high oxidative stability.

According to one advantageous feature of the lubricants aspect of the present invention are embodiments that use the polyol components of kelp slime (viz. mannitol, mannose, glucose, etc.) to provide physical strength to the polyol ester lubricant molecules via hydrogen bonding. One of the benefits of hydrogen bonding is creation of temporary bonds that break during an intense stress load and re-bond under stress cessation, thereby protecting scission of main chain lubricants and thus increasing the life of the lubricant. In addition, these polyol molecules provide an effective anti-oxidation mechanism with the abundance of hydroxyl groups on them which improves the oxidative degradation stability and wear performance of the lubrication system. A further benefit of the polyols includes an improved overall hydrolysis resistance of the lubricant.

In another art, U.S. Pat. No. 5,716,916[24] discloses a polyol ester based lubricant include structural modifications to the acid residue that is reacted to the polyol. This resulting lubricant is claimed to be highly compatible with hydrofluorocarbons substitutes such as R-407C and R-410A, has excellent hydrolysis resistance and low pour point.

Patent application US 2004/0235679 A1[25] discloses an improved biodegradable lubricant based on natural or synthetic base oils and other biodegradable additives that are suitable for marine applications.

Patent application US 2005/0049153 A1[26] discloses a biodegradable lubricant composition containing a complex polyol ester having a polyfunctional alcohol residue and a saturated or unsaturated dicarboxylic acid residue with improved performance.

According to another advantageous feature of the lubricant aspect of the present invention are embodiments that use, in addition to the drag reducing component and polyol based hydrogen bonding/anti-oxidative benefits, a novel biodegradable lubricant synthesized using the polyols (Mannitol, Mannose, etc.) from kelp slime and reacting them with a variety of fatty-acid esters to create hybrid lubricant structures.

Specific Lubricant Application

According to a recent Freedonia Groupmarket report, global lubricant demand is forecast to reach 40.5 million metric tons by the close of 2012. Although growth will be modest in volume terms, value gains will be more substantial as more expensive high performance lubricants are substituted for lower value ones. Increases will be aided by the ongoing expansion of the world motor vehicle park, as well as by a rebound in manufacturing and other industrial activity from the global economic slowdown of 2008 and 2009. Gains will be strongest in the Asia/Pacific, Africa/Mideast and Latin American regions due to ongoing rapid industrialization and rising car ownership rates.

"Industrial Lubricants" broadly include general industrial oils (hydraulic oils, gear oils, compressor oils, refrigeration oils, turbine oils, other general industrial oils, metalworking fluids (removal oil, forming oils, treating oils, protecting oils), Industrial engine oils (natural gas engine oils, aviation piston engine oils, marine oils, railroad oils, stationary engine oils) and Industrial greases. Consumer and commercial automotive lubricants include vehicle engine oil, hydraulic and transmission fluid, gear oil and greases. In 2004, automotive lubricants constituted 53% of the total lubricants, industrial lubricants 32%, marine oils 5% and process oils 10%. Of the total industrial lubricants, 37% were hydraulic oils, 7% industrial gear oils, 31% other industrial oils, 16% metalworking fluids, and 9% greases.

Refrigeration Lubricants:

The lubrication of refrigeration compressors occupies a special position in lubrication technology. The longevity expected of refrigeration compressors is closely connected to the high quality which is required of refrigeration oils. The interaction with other substances which the refrigeration oil comes into contact with, and especially the extremely high and low temperatures, makes very specific demands on refrigeration oils.

Turbine Lubricants:

Turbine oils contain special paraffinic base oils with good viscosity-temperature characteristics as well as antioxidants and corrosion inhibitors. The demands on turbine oils are defined by the turbines themselves and their specific operating conditions. The oil in the lubricating and control circuits of steam and gas turbines is required to provide hydrodynamic lubrication of all bearings and the lubrication of gear boxes, heat dissipation and avoid friction and wear on gear tooth flanks in turbine gearboxes.

Jet Engine Lubricants:

A jet engine is a reaction engine that discharges a fast moving jet of fluid to generate thrust by jet propulsion and in accordance with Newton's laws of motion. This broad definition of jet engines includes turbojets, turbofans, rockets, ramjets, pulse jets and pump-jets. In general, most jet engines are internal combustion engines. The lubrication system on a typical jet engine provides oil to the main bearings that support the engine's "spools" (a spool consists of a turbine and a compressor or fan, and the shaft that connects the two). These main bearings withstand extremely high forces, especially during tactical maneuvers with military jets[27]. The engine's lubrication system also provides oil to the power-take off assembly that drives the fuel pump, alternator, and the oil pump itself.

Wind Turbine Lubricants:

Wind turbines endure severe mechanical and environmental pressures. The bearings in the wind turbine gearbox must support high loads, with diverse bearing performance criteria throughout the gearbox. For instance, situations may vary from medium loads at low speeds to lower loads at higher speeds.

When winds speeds are very light and the blades rotate with low speeds, the interaction between the lubricant and the surrounding components are put to an extreme challenge.

Motor Oils:

Motor oil is a lubricant used in internal combustion engines. These include motor or road vehicles such as cars and motorcycles, heavier vehicles such as buses and commercial vehicles, non-road vehicles such as go-karts, snowmobiles, boats (fixed engine installations and outboards), lawn mowers, large agricultural and construction equipment, locomotives and aircraft, and static engines such as electrical generators. In engines, there are parts which move against each other causing friction which wastes otherwise useful power by converting the energy to heat. Contact between moving surfaces also wears away those parts, which could lead to lower efficiency and degradation of the engine. This increases fuel consumption and decreases power output and can, in extreme cases, lead to engine failure.

Hydraulic Fluids:

After engine oils, hydraulic oils are the second most important group of lubricants. Hydraulic fluids transfer energy and signals through fluids, and are based on mineral oils and synthetic fluids.

Catapult Oils:

An aircraft catapult is a device used to launch aircraft from ships—in particular aircraft carriers—as a form of assisted take off. It consists of a track built into the flight deck, below which is a large piston or shuttle that is attached through the track to the nose gear of the aircraft.

Drilling Fluids:

In geotechnical engineering, drilling fluid is a fluid used to drill boreholes into the earth. Often used while drilling oil and natural gas wells and on exploration drilling rigs, drilling fluids are also used for much simpler boreholes, such as water wells. Liquid drilling fluid is often called drilling mud. The main functions of drilling fluids include providing hydrostatic pressure to prevent formation fluids from entering into the well bore, keeping the drill bit cool and clean during drilling, carrying out drill cuttings, and suspending the drill cuttings while drilling is paused and when the drilling assembly is brought in and out of the hole. The drilling fluid used for a particular job is selected to avoid formation damage and to limit corrosion.

Grease Applications:

The term grease is used to describe semisolid lubricants. Although the word grease is also used to describe rendered fat of animals, in the context of lubricants, it typically applies to a material consisting of a soap emulsified with mineral or vegetable oil. The characteristic feature of greases is that they possess a high initial viscosity, which drops to give the effect of an oil-lubricated bearing of approximately the same viscosity as the base oil used in the grease. This change is called thixotropy. Grease is sometimes used to describe lubricating materials that are soft solids or high viscosity liquids at room temperature, but they may not exhibit the shear-thinning (thixotropic) properties typical of the oil/soap grease. For example, petroleum jellies, such as Vaseline which are commonly used for lubricating food-handling equipment, are not generally classified as greases. Greases are used where a mechanism can only be lubricated infrequently and where a lubricating oil would not stay in position. They also act as sealants to prevent ingress of water and incompressible materials. Grease-lubricated bearings have greater frictional characteristics due to their high viscosity.

Internal combustion engines, vehicle and industrial gearboxes, compressors, turbines and hydraulic systems, lubricants for marine applications, shock absorber oils, water turbine lubricants, gear lubricants, are some examples of applications where lubricants are used. The majority of lubricants currently used in the industry are naphthenic or paraffinic oils (mineral oils). However, with evolving new markets, technological advances and environmental concerns, synthetic lubricant formulations based on Polyol esters (POEs), Polyalkyl benzenes (PABs), Polyalkyl glycols (PAGs), Polyalphaolefins (PAOs) and Polyvinyl ethers (PVEs) are gaining prominence. Within this group of synthetic lubricants there is a wide range of physical characteristics in respect of solubility with refrigerant, viscosity index, pour point, lubricity, surface tension etc., in addition to significant differences in the end consumer cost.

As clear from the literature, prior artisans understanding the above clearly did not expect kelp slime to function as a superior lubricant, whether based on its components, fear of it drying out, perceived instability, or some other factor, the data collected by the present inventors demonstrate kelp's superior lubricant abilities in addition to its environmentally friendly properties. The relevant data regarding this aspect of the invention is discussed below.

Kelp Slime (Sieve Sap) and Kelp Analysis of *Macrosystis pyrifera*

I. Preparation of Kelp SAP Residue and Condensate Samples

Prior to analysis, 500 mL of kelp sap from *Macrosystis pyrifera* were placed in shallow aluminum foil pans and dewatered at 40° C. under full vacuum for 3 days. Volatiles from the sap were collected in a flask cooled in liquid nitrogen and designated as the condensate fraction. The condensate was placed in polypropylene bottles and refrigerated. The resulting solids, designated as the residue fraction, were weighed, ground to a fine powder, and refrigerated.

II. Sugar Analysis of Kelp SAP

The sugar analysis was adopted from the National Renewable Energy Laboratory (NREL) procedure entitled "Determination of Structural Carbohydrates and Lignin in Biomass" (NREL/TP-510-42618). Portions of this procedure are substantially similar to ASTM Method E1758-01, "Standard Method for the Determination of Carbohydrates by HPLC." In this procedure, the raw kelp sap is centrifuged to separate solids from the supernate. Solids are dried at 40° C. for 96 h and crushed to plus 20 mesh. The solids are contacted with 72% $H_2SO_4$ at 30° C. for 60 min to hydrolyze complex sugars to basic sugar units. Following the hydrolysis step, samples are diluted to 4% acid concentration with distilled water. Samples of the hydrolysate and supernate are analyzed for cellobiose, glucose, xylose, galactose, arabinose, mannose, and mannitol.

III. Kelp SAP Ultimate Analytical Results

The vacuum-dried kelp sap residue was oven-dried at 65° C. overnight to remove residual moisture and analyzed for carbon, hydrogen, nitrogen, sulfur, and ash content. Oxygen was determined by difference. The ultimate analytical results for the vacuum-dried, oven-dried, and as-received kelp sap are presented in Table 1.

The moisture reported was obtained from the kelp sap vacuum-drying data and the residue oven-drying data with 93.09% weight loss in the vacuum-drying step and 5.07% residual moisture in the resulting residue. The total moisture content in the kelp sap was 93.44%; the balance of the material was ash, carbon, hydrogen, nitrogen, sulfur, and oxygen.

TABLE 1

Kelp Sap Ultimate Analytical Results

| Constituent | As Received, g/100 g sap | Oven Dried, g/100 g residue | Vacuum Dried, g/100 g residue |
|---|---|---|---|
| Moisture | 93.44 | 0.00 | 5.07 |
| Carbon | 1.51 | 22.95 | 21.79 |
| Hydrogen | 0.26 | 4.04 | 3.83 |
| Nitrogen | 0.05 | 0.79 | 0.75 |
| Sulfur | 0.01 | 0.18 | 0.17 |
| Ash | 2.92 | 44.47 | 42.22 |
| Oxygen[a] | 1.81 | 27.57 | 26.17 |
| Total | 100.00 | 100.00 | 100.00 |

[a]Oxygen determined by difference

IV. Kelp SAP Elemental Analytical Results

The neat kelp sap and residue fraction were analyzed for other inorganic elements using AA (Atomic Absorption) and XRF (X-Ray Fluorescence) analytical methods. Based on these analytical results, a charge balance was made between cationic and anionic species, which showed good agreement with a 100.6% closure. The analytical and charge balance results are presented in Table 2.

The form of nitrogen in the kelp sap was not investigated in this work. Other researchers have characterized sieve tube sap from giant brown kelp (*Macrocystis pyrifera*) and reported 2.2 wt % amino acids and 0.16 wt % proteins in the tube sap.[1] Both amino acids and proteins contain organic nitrogen in the form of amine groups. Nitrates were detected, but at low concentrations ranging between 2±2 parts per million. Because the majority of the nitrogen in kelp sap has been reported as organic nitrogen rather than the nitrate ion (NO3−), nitrogen was not included in the charge balance. Phosphorus has been reported to be distributed in kelp sieve tube sap as organically bound phosphorus and inorganic phosphate. A high proportion of phosphorus in the kelp blade was in the form of inorganic phosphorus (75-79%), but only 11-13% of the phosphorus was found as inorganic phosphorus in the sieve tube sap.[28]

TABLE 2

Kelp Sap Inorganic Elemental Analytical Results

| Constituent | Analysis, g/100 g sap | Cation Charge, moles (+) charge/100 g sap | Anion Charge, moles (−) charge/100 g sap |
|---|---|---|---|
| Na[a] | 0.2773 | 0.0121 | |
| Mg[a] | 0.0386 | 0.0032 | |
| P[b] | 0.0381 | | 0.0037[e] |
| S[c] | 0.0120 | | 0.0008[f] |
| Cl[d] | 1.400 | | 0.0395 |
| K[a] | 1.011 | 0.0259 | |
| Ca[a] | 0.0569 | 0.0032 | |
| Br[b] | 0.0109 | | 0.0001 |
| I[b] | 0.0142 | | 0.0001 |
| Total | | 0.0439 | 0.0442 |

[a]Neat kelp sap analyzed by AA
[b]Kelp sap residue analyzed by XRF
[c]Kelp sap residue analyzed per ASTM Method D4239
[d]Kelp sap residue analyzed per ASTM Method D2361
[e]Phosphorus as $PO_4^{3-}$
[f]Sulfur as $SO_4^{2-}$ V. Sugar Analytical Results The kelp sap condensate and residue fractions were analyzed for organic compounds. Using UV, multi-angle light-scattering, and refractometry GPC-MALS data, mannitol as one of the components in the kelp residue. Four other smaller peaks were also observed and thought to be low-molecular-weight sugars. In addition, low levels of a high-molecular weight material (greater than 300,000) were also detected. The amount of mannitol in the residue was later quantified at 25.15 wt % of the kelp residue. This is equivalent to 1.65% mannitol in the as-received kelp sap. Following the NREL procedure (NREL/TP-510-42618), a sample of kelp sap was centrifuged into two fractions, a supernate and solids. The solids were then hydrolyzed with $H_2SO_4$ as previously described. Duplicate hydrolysate and supernate samples were analyzed for cellobiose, glucose, xylose, galactose, arabinose, mannose, and mannitol. A sample of the neat kelp sap was also analyzed for the six sugars and mannitol. The kelp sap was filtered through a 0.45-micrometer filter to remove solids and analyzed. The sample was not hydrolyzed. The concentration of mannitol on an as-received kelp sap basis was 2.62 wt %. Only one sugar was detected in the supernate, mannose at 0.013 wt %. Similarly, only mannose was detected in the centrifuged supernate sample. Mannitol and mannose concentrations in the filtered kelp sap and the centrifuged supernate were in good agreement. Table 3 summarizes the sugar and mannitol results for the two cases.

TABLE 3

Kelp sap sugar and Mannitol results

| Constituent | Filtered Kelp Sap, g/100 g sap | Kelp Sap Supernate, g/100 g sap | Kelp Sap Solids, g/100 g sap | Total, g/100 g sap |
|---|---|---|---|---|
| Cellobiose | 0.000 | 0.000 | 0.000 | 0.000 |
| Glucose | 0.000 | 0.000 | 0.008 | 0.008 |
| Xylose | 0.000 | 0.000 | 0.000 | 0.000 |
| Galactose | 0.000 | 0.000 | 0.001 | 0.001 |
| Arabinose | 0.000 | 0.000 | 0.001 | 0.001 |
| Mannose | 0.013 | 0.014 | 0.000 | 0.014 |
| Mannitol | 2.62 | 2.53 | 0.017 | 2.55 |

The fact that only one sugar was detected in the unhydrolyzed supernate samples compared with the four sugars detected in the hydrolyzed solids fraction suggests glucose, galactose, and arabinose are products derived from the hydrolysis process. Based on these findings, it is speculated that these sugars in the kelp sap are present in their polymeric form: cellulose (glucose polymer), galactan (galactose polymer), and arabinan (arabinose polymer). Adjusting the sugar results for water of hydration from the hydrolysis process gives the weight percent of polymers in the as-received kelp sap: 0.007% cellulose, 0.001% galactan, and 0.001% arabinan. In addition, the GC work found an unidentified organic compound in the kelp sap with an estimated molecular weight of 300,000. Mass balance calculations indicate the unidentified compound accounts for about 1% of the kelp sap mass. This polymer material was determined to have C/H and C/O molar ratios of approximately 0.677 and 1.313. Further work to identify and quantify these polymers is underway.

Prophetic Examples of the Kelp Slime-Based Lubricant/Additives

Natural Algae "Synthetic" Lubricant (NASL):

The present inventors have coined the term "NASL" to refer to the Natural Algae Based Synthetic Lubricant base material derived from kelp slime. According to a presently preferred embodiment, the process of obtaining NASL from macroalgae involves the steps of collecting kelp slime from kelp via draining after harvesting as depicted and described in connection with FIG. 1, further collecting slime after chopping/milling, and/or collecting slime with other suitable means at other suitable times in the overall process. The collected slime is then dried or evaporated to remove substantially all moisture. Preferably, although not necessarily required for all applications, the dried product/suprenatant is treated to remove ash (mainly salts and oxides) remaining after drying via dialysis or other techniques known in the relevant art.

The remaining material after ash removal, which the inventors refer to as the NASL base, comprises a substantial portion of Mannitol and a high molecular weight (MW) polymer, meaning a polymer having a molecular weight so much higher than a typical lubricant base so as to provide drag reduction properties when used, e.g., a molecular weight above 100,000 and preferably above 200,000 and even more preferably above 300,000.

In at least the case of *Macrosystis pyrifera*, the NASL base comprises two polyols, Mannitol and Mannose, wherein Mannitol is the primary polyols found in a percentage by weight of up to about 65-75% (Mannose is present in less than 0.5% by weight); and a high molecular weight polymer having a MW of around 300,000 and present in a percentage by weight of up to about 30%. The table below shows the actual composition of a sample of NASL derived from *Macrosystis pyrifera*:

TABLE 3

Components by Weight of Kelp Slime and NASL

| Component | Percent by Weight as Recv'd | Percent by Weight after Drying | Percent by Weight Dried/No-ash NASL |
|---|---|---|---|
| Moisture | 93.44 | — | — |
| Ash | 2.92 | 44.73 | — |
| Mannitol | 2.545 | 38.99 | 70.54 |
| Mannose | 0.014 | 0.21 | 0.39 |
| Glucose (poly) | 0.007 | 0.11 | 0.19 |
| Galactose (poly) | 0.001 | 0.02 | 0.03 |
| Arabinose (poly) | 0.001 | 0.02 | 0.03 |
| Polymer (MW ~300,000) | 1.04 | 15.93 | 28.82 |

Although not wishing to be bound by theory, the present inventors believe that these constituent components of NASL provide superior and unexpected advantages when it comes to lubrication and drag reduction. Specifically, the present inventors contend that the polyols of NASL not only provide hydrogen bonding but also lend to inhibiting the formation of acidic conditions which thereby increases life and wear performance of a compressor and the lubricant used therein.

Likewise, the present inventors contend that the high molecular weight polymer portion of the NASL base provides unexpected and superior drag reducing properties in view of its long and flexible chains in conjunction with its chemical compatability with the bulk fluid to which it is introduced (e.g., polyol based lubricants, POE, PAE, and the like).

Prophetic NASL Uses and Applications

In one embodiment of the invention, there is provided a NASL additive consisting of the polyols Mannitol and Mannose ("NASL Polyols") and a mixture of polymers. The polymers consist of a high molecular weight polymer (greater that 300,000 containing carbon, hydrogen, oxygen and optionally nitrogen) and at least three other polymers that include a glucose polymer, a galactose polymer and an arabinose polymer. The polymer with a molecular weight greater than 300,000 acts as a drag reducing agent and potentially the remaining three polymers may also provide a drag reducing benefit.

The polyols (Mannitol and Mannose) in the NASL act as hydrogen bonding agents to protect the lubricant base under high stress conditions, improve hydrolysis stability of the lubricant and provide a means for oxidative stability. They may be used independently or together with the NASL drag reducing polymers described above in lubricant formulations at loading levels of anywhere from a few parts per million to about 30%.

The polymers in the NASL (including the known high molecular weight polymer), while being compatible with the lubricant, preferentially locate in the boundary layer of lubrication and reduce drag. They may be used independently or together with the NASL polyols in lubricant formulations at loading levels of anywhere from a few parts per million to about 30%.

A base lubricant may be selected from a petroleum-based oil, a synthetic oil, a mineral oil, a silicone oil, a hydraulic fluid, a transmission fluid, or any other like material. Representative lubricants in refrigeration compressors include synthetic oils, viz. Polyol esters (POE oil), Polyalkyl glycols (PAG), Polyalkyl benzenes (PAB), Polyalphaolefins (PAO), Polyvinyl ethers (PVE) and mineral based oils (MO). Polyol ester oils or lubricants are the most preferred base lubricants for use with the NASL and NASL formulations of the present invention.

The energy saving lubricant/NASL mixtures may be used with refrigerants including, but not limited to, those known by the ASHRAE code numbers R-100, 200, 300, 400, 500 and 600 series. Some specific examples include R-22, R-12, R-11, R-134a, R-245fa, R-407C (mixture of R-125/R-32/R-134a), R-410A (mixture of R-125/R-32), R-417A (mixture of R-125/R-134a/R-600), R-401A/B (mixture of R-22/R-152a/R-124), R-409A (mixture of R-22/R-1241R-142b), R-402A/B (mixture of R-22/R-125/R-290), R-408A (mixture of R-22/R-125/R-143a), R-23, R-508A, R-404A, R-507, R-422A, R-290, R-600a, R-717 and R-744.

The NASL energy saving lubricant additives of the present invention may also be used in other lubricant applications including, but not limited to, turbines, jet engines, aviation piston engines, aircraft catapults, marine engines, railroad oils, wind turbines, hydraulic and transmission fluids, drilling fluids, gears, shock absorbers, motor oils and greases.

According to other embodiments of the present invention there is also provided a "hybrid" polyol ester based lubricant made by reacting the polyols in NASL (e.g., Mannitol and to a lesser extent Mannose) with a mixture of fatty acid esters. The fatty acid esters, preferably with carbon chain lengths varying from 2 to 30, are also preferably from natural products, including but not limited to one or more of the following: lauric, myristic, capric, palmitic, iso-palmitic, stearic, hexadecenoic, caproic, caprylic, linoleic, elaidic, behenic acids, or like fatty acid esters (General structure of a fatty acid ester can be written as RC(=O)OR', wherein R is a saturated or unsaturated carbon chain and R' can be hydrogen atom).

In addition, according to other embodiments of the invention, the hybrid polyol ester based energy saving lubricants described above may also include the drag reducing polymers (also discussed above) to enhance drag reduction during lubrication application.

In accordance with other advantageous features of other embodiments of the invention, the hybrid polyol ester based energy saving lubricants described above may be used as base lubricant in the lubricant applications described herein. In other words, the hybrid lubricant is preferably able to serve as a partial or total replacement for existing lubricants in most typical applications. One of ordinary skill in the art will readily appreciate the environmental benefits of the availability of such a hybrid lubricant and will be able to determine its suitability for any intended use through routine experimentation.

In presently preferred embodiments of the invention, the NASL is derived from the kelp slime of *Macrocystis pyrifera*.

In alternative embodiments of the present invention, the NASL is derived from any of any other suitable macroalgae, including but not limited to brown macroalgae: *Lamonaria Japonica, Fucus Vesiculosis, Undaria Pinnatifida*; red macroalgae: *Porphyra, Eucheuma, Kappaphycus* and *Gracilaria*; and green macroalgae including *Monostroma* and *Enteromorpha*.

As will be appreciated by one of ordinary skill in the art, the suitability of NASL derived from any source is a matter of routine experimentation for one of ordinary skill in the art armed with the present specification.

As clear from the foregoing, the various different embodiments of the present invention provide a wide spectrum of various novel kelp-based products and methods of cultivating, harvesting, processing, refining, recovering, using, and conserving kelp and kelp-based products.

Those skilled in the art will appreciate that various adaptations and modifications of the above-described preferred embodiments can be configured without departing from the scope and spirit of the invention. Therefore, it is to be understood that, within the scope of the appended claims, the invention may be practiced other than as specifically described herein.

REFERENCES

[1] Oilgae Guide to Fuels from Macroalgae, A Report by Oilgae (Chennai, India) April 2010.

[2] Flower E. Msuya and Amir Neori, "*Ulva reticulata* and *Gracilaria crassa*: Macroalgae That Can Biofilter Effluent from Tidal Fishponds in Tanzania", Western Indian Ocean J. Mar. Sci. Vol. 1, No. 2, pp. 117-126, 2002

[3] Bushing William (2000), "Giant Bladder Kelp (*Macrocystis Pyrifera*)", Marine Science Institute, University of California, Santa Barbara

[4] Aquatic Species Program, 1983 Annual Report SERI PR-231-2272.

[5] Martone et al., "Discovery of Lignin in Seaweed Reveals Convergent Evolution of Cell-Wall Architecture", Current Biology 19, 169-175, Jan. 27, 2009

[6] A B Cribb, "*Macrocystis pyrifera* (L.) Ag. in Tasmanian Waters", Australian Journal of Marine and Freshwater Research 5(1) 1-34 (1953).

[7] Jae-I I Park, Jinwon Lee, Sang Jun Sim and Jae-Hwa Lee. Production of hydrogen from marine macro-algae biomass using anaerobic sewage sludge microflora. Biotechnology and BioProcess Engineering. Vol 14, No 3, 307-315 (2009)

[8] Nobuo Suzuki, Yoshihiro Iwata, "Determination of arsenic and other elemental abundances in marine macro-algae by photon activation analysis", Applied Organometallic Chemistry, Volume 4, Issue 3: 287-291 1990

[9] Dong Zhou, Liang Zhang, Shicheng Zhang*, Hongbo Fu and Jianmin Chen, "Hydrothermal Liquefaction of Macroalgae *Enteromorpha prolifera* to Bio-oil". Energy Fuels, 2010, 24 (7), pp 4054-4061

[10] A. B. Ross, K. Anastasakis, M. Kubackia and J. M. Jonesa "Investigation of the pyrolysis behaviour of brown algae before and after pre-treatment using PY-GC/MS and TGA" Journal of Analytical and Applied Pyrolysis Volume 85, Issues 1-2, May 2009, Pages 3-10

[11] Ross, A., Jones, J., Kubacki, M., & Bridgeman, T. (2008). Classification of macroalgae as fuel and its thermochemical behaviour. Bioresource Technology (2008) Volume: 99, Issue: 14, Pages: 6494-6504 Retrieved from http://www.ncbi.nlm.nih.gov/pubmed/18194859

[12] D. Li et al., "Pyrolytic characteristics and kinetics of two brown algae and sodium alginate". Bioresource Technology Volume 101, Issue 18, September 2010, Pages 7131-7136

[13] Aresta, M., Dibenedetto, A., Carone, M., Colonna, T., & Fragale, C. (2005). Production of biodiesel from macroalgae by supercritical CO2 extraction and thermochemical liquefaction, 3(3), 136-139. Environmental Chemistry Letters (2005) Volume: 3, Issue: 3, Pages: 136-139

[14] M. Ringer, V. Putsche, and J. Scahill, "Large-Scale Pyrolysis Oil NREL/TP-510-37779 Production: A Technology Assessment and Economic Analysis". November 2006.

[15] A. B. Ross, T. Bridgeman, K. Anastasakis, J. M. Jones and M. Kelly, "Production and properties of bio-char from macroalgae" Poster presentation. UK Biochar Conference 2010.

[16] UOP (A Honeywell Company) News release, Oct. 28, 2008 "UOP and partners will develop technology to improve the stability of pyrolysis oil to ensure its viability as a source for power and transportation fuels" Under the US Department of Energy Award.

[17] BioFuels Journal, Press Release Sep. 9, 2010 "DOE to Award Up to $16.5M to R&D Initiatives for Renewable Hydrocarbon Transportation Fuels Via Pyrolysis and Sustainable Bioenergy Feedstock Production"

[18] Manley (1983): Composition of Sieve tube sap from *Macrocystis Pyrifera* (Phaeophyta) with emphasis on the inorganic constituents, S. L. Manley, J. Phycol: 19, 188-121 (1983).

[19] Chapter 15-Refrigeration Lubricants-Properties and Applications, H. H. Michaels, T. H. Sienel, United Technologies Research Center, CT

[20] Elastohydrodynamic lubrication and lubricant rheology in refrigeration compounds, Ulf Jonsson, Doctoral thesis 1998, Lulea University of Technology Sweden.

[21] Development of lubricants for industrial refrigeration, P M Banfi and A P Swallow—Castrol Specialised Industrial Technological Center. Politecnico di Milano 27th-28th Jun. 2003. UCON Product Bulletin, Lubricant 993, PAG

[22] Schlosberg et al. U.S. Pat. No. 5,744,434. Polyol ester compositions with unconverted hydroxyl groups (1998).

[23] Lawate et al. U.S. Pat. No. 5,773,391. High Oleic polyol esters, compositions and lubricants, functional fluids and greases containing the same (1998).

[24] Shiokawa et al., U.S. Pat. No. 5,716,916. Polyol ester based-lubricant.

[25] Kuosky et al., US 2004/0235679 A1. Biodegradable lubricants.

[26] Zehler et al., US 2005/0049153. Complex polyol esters with improved performance.

[27] Military jet engine acquisition: Technology basics and cost estimating methodology. MR-1596-AF, RAND Corporation report 2003.

[28] Schmitz, Klaus, and Srivastava, Lalit M. 1979. Long distance transport in *Macrocystis integrifolia*, II. Tracer experiments with 14C and 32P. Plant Physiology 63:1003-1009.

We claim:

1. A method of making a natural algae synthetic lubricant composition comprising:
   harvesting marine macroalgae from the ocean;
   collecting at least a portion of sieve sap from said harvested marine macroalgae by placing said harvested marine macroalgae in a collection vessel configured to gravitationally drain and collect sieve sap from outer surfaces of said harvested marcoalgae;
   drying said collected sieve sap to remove a substantial amount of moisture therefrom; and
   removing a substantial amount of salts and oxides from said dried sieve sap.

2. The method of claim 1, wherein said drying step comprises removing water from said sieve sap.

3. The method of claim 2, wherein said removing salt step comprises dialysis.

4. The method of claim 1, wherein said harvesting step involves harvesting kelp.

5. The method of claim 4, wherein said kelp is *Macrosystis pyrifera*.

* * * * *